Sept. 23, 1969  S. E. RUTLEDGE  3,468,359
TIRE BOOT
Filed Nov. 17, 1966
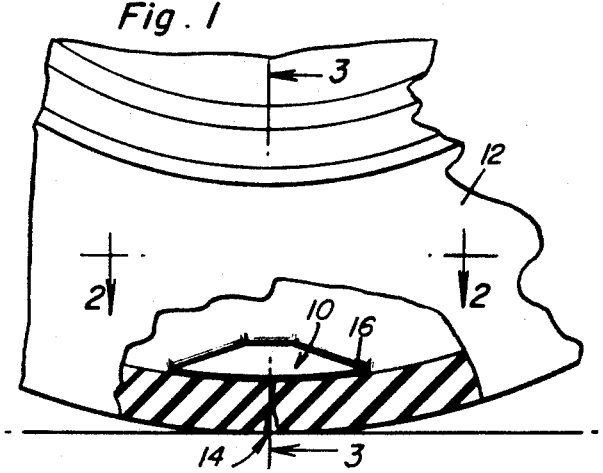
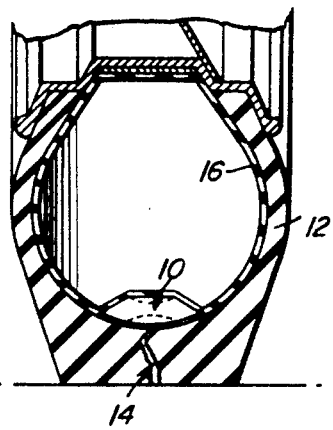
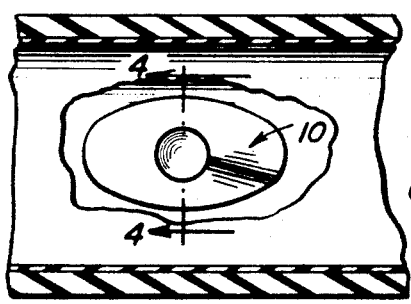
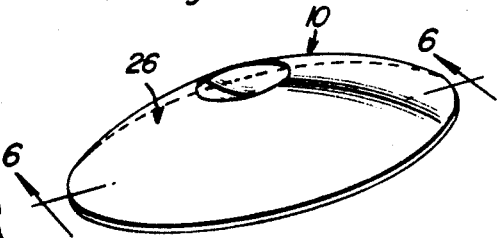
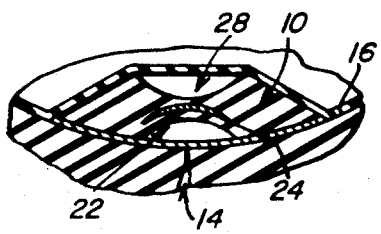
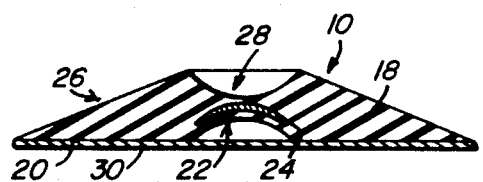
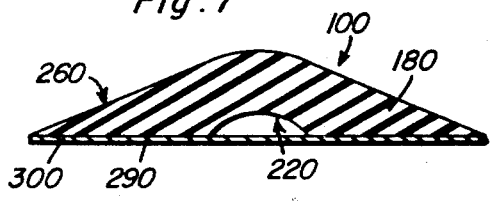
Seth E. Rutledge
INVENTOR.

United States Patent Office 3,468,359
Patented Sept. 23, 1969

3,468,359
TIRE BOOT
Seth E. Rutledge, Tampa, Fla., assignor to
Small Business Administration
Filed Nov. 17, 1966, Ser. No. 595,197
Int. Cl. B60c 21/02
U.S. Cl. 152—367                    5 Claims

ABSTRACT OF THE DISCLOSURE

A tire boot secured to the inner wall of a tire in overlying and sealing relation to a puncture in the tire, which boot comprises a relatively rigid resilient member having a generally conical upper surface and a generally planar lower surface provided with a concavity for reducing the pressure exerted by the fluid within the tire against the wall of the tire contiguous with the puncture.

---

This invention relates to a means of repairing punctured or ruptured pneumatic tire casings and more particularly to the provision of novel tire boots particularly adapted for the repairing of punctures in tube type pneumatic tires.

Numerous tire boots have been proposed heretofore for the repairing of ruptures in pneumatic tires. Many such repair boots have been somewhat less than satisfactory due to the fact that they tend to exert too high a pressure against the tire casing at the site of the rupture thus tending to create a somewhat less than desirable condition wherein the tire casing may be further damaged by such pressure exerted against the site of the rupture.

Accordingly, it is a primary object of the present invention to provide novel boots for pneumatic tires including means for substantially reducing the pressure exerted against the site of a rupture in the tire casing.

Another object of the present invention is to provide a novel tire boot for the repair of ruptures in pneumatic tire casings wherein there is provided a generally rigid yet resilient boot having a concavity therein adapted to be adhesively secured in juxtaposed overling relationship to a rupture in the pneumatic tire whereby the area adjacent the interior of the casing surrounding the rupture is maintained at a pressure substantially below that of the interior of the tire so as to insure the integrity of the repair.

A further object of the present invention is to provide a novel tire boot which is characterized by a generally conical configuration and includes a concavity on the lower surface thereof and adapted to be adhesively secured in juxtaposed overlying relation to a puncture in a pneumatic tire casing so as to simultaneously seal off the area of the puncture from the remainder of the interior of the tire and substantially reduce the pressure exerted against the area of the puncture due to the fact that the material from which the boot is constructed is sufficiently rigid to prevent the flattening out of the boot so as to bring the boot into direct contact with the rupture.

Still another object of the present invention is to provide a novel generally conical tire boot having a concavity in the generally planar lower surface thereof which boot is also provided with a centrally disposed concavity at the apex of the upper surface to assist in reducing the pressure bearing against the site of the rupture.

These together with other objects and advantages which will become subsequently apparent reside in the details of construction and mode of utilization as more fully hereinafter described and claimed, reference being had to the accompanying drawings forming a part hereof, wherein like numerals refer to like parts throughout, and in which:

FIGURE 1 is a fragmentary side elevational view of a pneumatic tire with portions of the tire casing being broken away to show a portion of the tread area of the tire, in section, with a tire boot constructed in accordance with the principles of the present invention being juxtaposed in overlying relation to a puncture in the tire casing;

FIGURE 2 is a fragmentary horizontal sectional view taken substantially along the plane of the line 2—2 of FIGURE 1;

FIGURE 3 is a vertical cross-sectional view of a pneumatic tire showing an exemplary embodiment of the present invention positioned therein to repair a puncture;

FIGURE 4 is a fragmentary enlarged vertical cross-sectional view of an exemplary embodiment of a tire boot constructed in accordance with the principles of the present invention and taken substantially along the plane of the line 4—4 of FIGURE 1;

FIGURE 5 is a perspective view of the embodiment of the invention illustrated in FIGURES 1–4;

FIGURE 6 is a transverse vertical sectional view of the tire boot of FIGURE 5 taken substantially along the plane of the line 6—6 of FIGURE 5; and FIGURE 7 is a transverse vertical sectional view of another embodiment of a tire boot constructed in accordance with the principles of the present invention.

Referring now to the drawings it will be seen that an exemplary embodiment of a tire boot indicated generally at 10 is shown adhesively secured within the casing of a tire 12 in juxtaposed overlying relation to a puncture or rupture indicated generally at 14 through the tread portion of the tire 12, wherein the tire boot 10 is disposed between the tread portion of the casing of the tire 12 and a pneumatic inner tube 16. As seen best in FIGURES 5 and 6 the exemplary embodiment of the tire boot illustrated therein comprises a generally conical body member 18 formed of a relatively rigid yet resilient material such as natural or synthetic rubber, for example. The undersurface 20 of the body member 18 is normally generally planar and is further provided with a concavity indicated generally at 22 preferably, although not necessarily, centrally disposed on the lower surface 20 of the body member 18. For reasons which will become clear hereinafter a downwardly opening convex disk-like reinforcing member 24 formed of a material such as metal, substantially rigid plastic, or the like having a rigidity greater than that of the body member 18 may be embedded in the body member 18 in generally overlying relationship to the concavity 22.

The generally conical upper surface 26 of the tire boot 10 may be provided with a centrally disposed concavity indicated generally at 28 and disposed adjacent the apex of the body member 18 so as to impart a generally frustoconical configuration to the embodiment 10 of a tire boot constructed in accordance with the present invention. As seen in FIGURE 7, however, wherein there is illustrated another embodiment 100 of a tire boot constructed in accordance with the principles of the present invention the upper conical surface 260 of the body 180 of the tire boot is not provided with a concavity. It will further be seen that while the lower surface 200 of the body 180 is provided with a centrally disposed concavity 220 a reinforcing member, such as indicated at 24 in the embodiment 10, a reinforcing disk-like member is not embedded in the relatively rigid yet resilient body 180.

Both of the embodiments 10 and 100 of the tire boot may also be provided with a lamina 30 or 300, respectively, secured to and coextending with the lower surfaces of the respective tire boots, which lamina is preferably of a reinforcing fabric formed of either natural or synthetic fibers. Although not critical, in certain instances it may be desirable that the laminae 30 and 300 are generally air impervious so as to permit the maintenance of a partial pressure within the respective concavities 22 and 220 for reasons which will become apparent hereinafter during a discussion of the mode of utilization of the tire boot of the present invention.

Referring now to the mode of utilization of the tire boots 10 and 100 it will be understood that while the tire boot 10 is illustrated as being utilized in conjunction with a pneumatic tire of the tube-type it will nevertheless be understood that tire boots constructed in accordance with the principles of the present invention may also be utilized in conjunction with pneumatic tires of the tubeless type. Referring again specifically to FIGURES 1-4 it will be seen that the tire boot 10 is secured within the casing of the tire 12 in juxtaposed overlying relation to the puncture 14 by means of a suitable adhesive applied to the lower surface 20 or lamina 30 of the tire boot 10. As indicated heretofore it is imperative that the concavity 22 be positioned in overlying relation to the puncture 14 so as to insure that downward pressure exerted on the body 18 of the tire boot 10 such as by the tube 16 in the case of a tube-type tire, or air pressure per se in the case of a tubeless type tire, will not exert a pressure equal to that of the pressure within the tire upon the area adjacent the rupture 14. It will be furthermore appreciated that the reduction of pressure on the area adjacent the rupture 14 may also be facilitated by the inclusion of the reinforcing member 24, which of course tends to resist collapse of and thus reduction in volume of the concavity 22.

The upper concavity 28 also assists in materially reducing the downward pressure upon the area of the casing adjacent the rupture 14, such as will be appreciated from FIGURE 4, wherein it is seen that the tube 16 bridgingly engages the upper surface 26 of the body 18 of the tire boot 10 across the upper rim of the concavity 28 and thereby creating an air cushion area within the concavity 28 allowing the tube 16 to intimately expand thereinto whereby the concavity 28 acts as a damper to absorb pressure fluctuations without transmitting the pressure to the tire casing adjacent the rupture 14. In addition, when utilizing a generally air impervious lamina 30 the concavity 22 may be placed under partial pressure so as to further assist in assuring that the area of the casing adjacent the rupture 14 is not subjected to the pressure generally prevalent within the tire thereby assuring that the tire boot 10 will maintain the integrity of the repair over an extended period of time. The mode of utilization of the embodiment 100 will be understood to be substantially analogous to that of the utilization of the embodiment 10. It will furthermore be appreciated that the lamina 30 may be of the type conventionally utilized in conjunction with planar tire and tube patches wherein the lamina 30 is provided with a self-adhesive coating for adhesively securing the tire boot to the tire casing.

What is claimed as new is as follows:

1. In combination with a pneumatic tire a tire boot secured to the inner wall of the tire in overlying and sealing relation to a puncture in the tire, said tire boot comprising a relatively rigid resilient member, said body member having a generally planar lower surface and a generally conical upper surface, said lower surface of said body member being provided with means for reducing the pressure exerted by pressurized fluid within the tire against the wall of the tire contiguous with the puncture, said means comprising a concavity.

2. The combination of claim 1 wherein said upper generally conical surface of said body member is provided with a concavity in non-communicating relation to said concavity in said lower surface.

3. The combination of claim 1 including an adhesive receptive lamina secured to and contiguous with the lower surface of said body member in bridging relationship to said concavity.

4. The combination of claim 1 including a generally convex relatively rigid reinforcing member integral with said body member and disposed in overlying relationship to said concavity in said lower surface of said body member.

5. The combination of claim 3 including a generally convex relatively rigid reinforcing member integral with said body member and disposed in overlying relationship to said concavity in said lower surface of said body member.

References Cited

UNITED STATES PATENTS

| 1,967,977 | 7/1934 | Spitter | 152—369 |
| 2,852,058 | 9/1958 | Chambers | 152—367 |
| 3,332,466 | 7/1967 | Wolfe | 152—365 |

FOREIGN PATENTS

| 105,260 | 1917 | Great Britain |
| 1,130,719 | 5/1962 | Germany. |

ARTHUR L. LA POINT, Primary Examiner

C. B. LYON, Assistant Examiner